United States Patent [19]

Palumbo

[11] Patent Number: 4,602,474
[45] Date of Patent: Jul. 29, 1986

[54] ADJUSTABLE HOE ATTACHMENT FOR RAKE

[76] Inventor: Juluis T. Palumbo, Rte. 2 Box 470, Sulphur, La. 70663

[21] Appl. No.: 676,513

[22] Filed: Nov. 29, 1984

[51] Int. Cl.⁴ .......................... A01B 1/06; A01B 1/20; A01D 7/00
[52] U.S. Cl. ................................................ 56/400.05
[58] Field of Search ............... 172/14, 643, 705, 375, 172/378; 56/400.05, 400.01; 294/53.5, 51, 59

[56] References Cited

U.S. PATENT DOCUMENTS

| 923,629 | 6/1909 | Dalpay | 56/400.05 |
| 1,185,498 | 5/1916 | Gooding | 172/707 |
| 1,339,436 | 5/1920 | Conrad | 56/400.05 |
| 1,537,005 | 5/1925 | Carson | 56/400.05 |
| 2,469,012 | 5/1949 | Smith | 56/400.05 |
| 2,699,640 | 1/1955 | Sattilaro | 294/53.5 |
| 2,726,504 | 12/1955 | Paluska | 56/400.05 |
| 3,402,543 | 9/1968 | Staggers | 56/400.05 |

Primary Examiner—Richard J. Johnson

[57] ABSTRACT

The invention is an attachment composed of steel which attaches and is adjustable to any size garden rake. The invention allows a standard rake to be converted in effect to a hoe, which can be used for weeding, trimming or any similar operations.

1 Claim, 7 Drawing Figures

ADJUSTABLE HOE ATTACHMENT FOR RAKE

The object of the invention is to convert any typical garden rake into a second tool which can be used as a hoe for trimming, cutting and similar operations.

Another feature of the invention is its design which allows it to be adjustable to fit any size rake. This adjustability allows for different measurements between rake prongs, being composed of steel material, light weight in design and it can be easily assembled or disassembled. It requires no special tools for assembly due to simplicity of design it is easy to sharpen the cutting edge with a simple metal file when attached to the rake; The invention because of its design could be manufactured effectively which, therefore would be relatively inexpensive for the consumer.

Other objects and advantages will become apparent of the invention through detailed description and accompanying drawings, in which.

Figure 1:
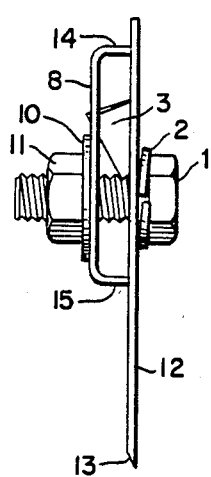
FIG. 1 is a sectional view of the attachment fully assembled.

Referring first to the FIGS. of 1 and 2 FIG. 1 shows the components of the adjustable attachment as bolt 1, lockwasher 2 washer 10, nut 11, and raised lip 3, of hoe 12, cutting edge 13 is shown and clamp strap 8 with bends 14 and 15.

Figure 2:
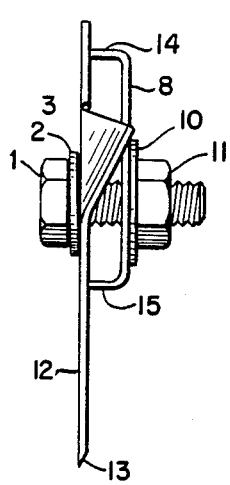
FIG. 2 is also a sectional view of the assembled attachment from the opposite side.

FIG. 2 is an opposite view of FIG. 1 showing the same components

Figure 3:
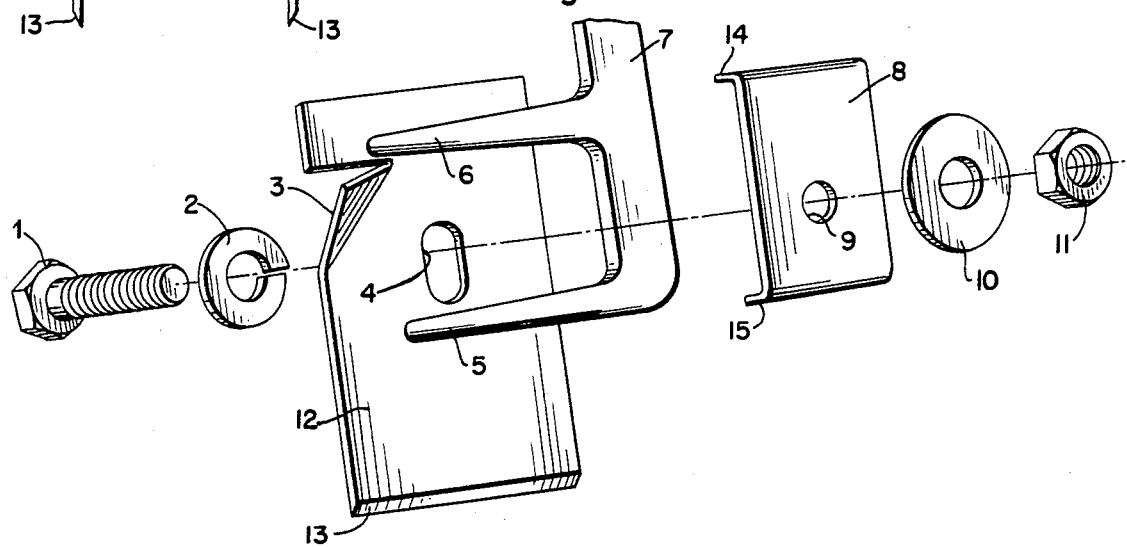
FIG. 3 is an exploded view of the attachment showing all components and the manner in which the attachment is assembled to a typical rake.

FIG. 3 actually shows how the attachment can be attached to the rake. A 5/16" bolt 1 is used to secure the main body of the attachment 12 herein called the hoe to the rake 7, by a clamping device called a clamp strap 8. A steel washer 2, is used under the head of the bolt 1, to prevent loosening. Washer 10, is used under the nut 11, to complete the assembly of the attachment the hoe 12, consists of a cutting edge 13, an elongated hole 4, and a raised lip 3, which allows the attachment to be fully adjustable to fit any size rake. The clamp strap 8 consists of hole 9 and two 90 degree bends 14 and 15 fit over the two out board prongs 5 and 6 of the rake 7. The elongated hole 4, allows the hoe 12, to be moved in such a manner so that the raised lip is butted up against the rake prong 6, after torquing the nut 11, the raised lip 3, and the clamp strap 8, effectively secure the attachment to the rake.

Figure 4:
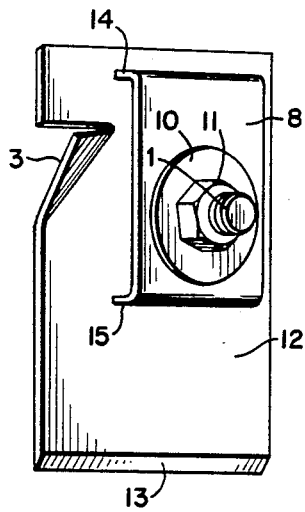
FIG. 4 is a representation of the attachment from the forward plane angle, conversely.
Figure 6:
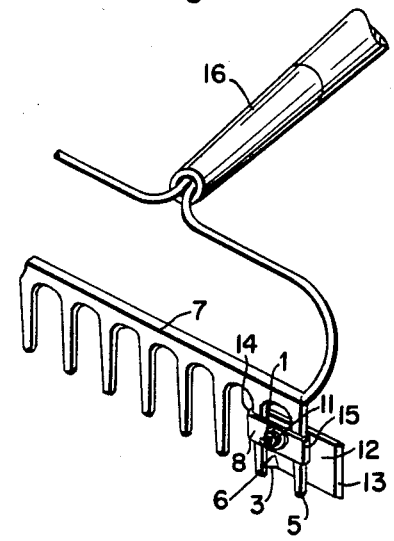
FIG. 6 is a perspective view of the fully assembled attachment to the rake.

FIG. 4 shows a front view of the attachment as in relationship to FIG. 6, FIG. 4 is the actual size of the complete attachment which weighs less than one ounce. The attachment consists of hoe 12, cutting edge 13, raised lip 3, clamp strap 8 with bends 14 and 15, bolt 1, washer 10, and nut 11.

Figure 7:
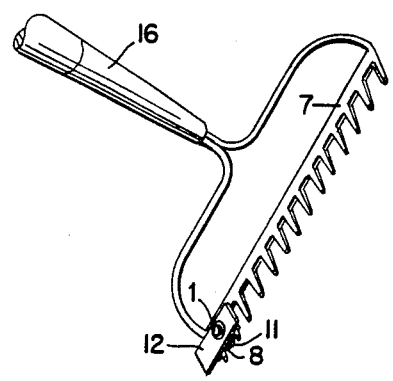
FIG. 7 is an elevational view showing the attachment being used in a typical operation, relating specifically to the drawing like numerals relating to the parts throughout the figures.
Figure 5:
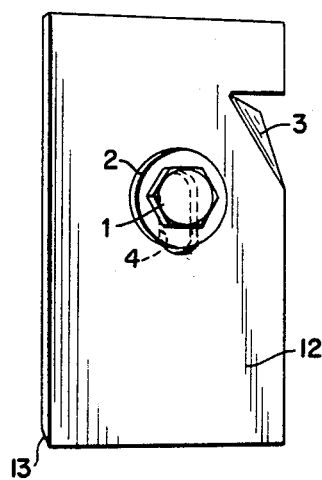
FIG. 5 shows the attachment from the opposite view.

FIG. 5 shows the opposite view of the attachment as in relationship to FIG. 7, FIG. 5, is also the actual size of the complete attachment but shows elongated hole 4, within hoe 12. The figure also shows bolt 1, lockwasher 2, raised lip 3, and cutting edge 13.

The attachment is shown fully assembled in FIG. 6. The attachment consisting of hoe 12, is mounted on left inside of rake 7. The raised lip 3, abuts prong 6, while clamp strap 8, with bends 14, and 15 is torqued down by nut 11, and bolt 1, over the prongs 5 and 6, The handle is designated by numeral 16.

FIG. 7 shows the attachment components; hoe 12, clamp strap 8, nut 11, and bolt 1, when used in the operating mode as shown. The rake 7 is held by the handle 16, and turned on end for hoeing operations.

I claim:

1. A hoe attachment for a hand held rake having a row of spaced apart rigid teeth, said attachment comprising, a generally flat rectangular blade having a sharpened edge along one end, an elongated opening in the central portion of said blade, a raised lip along one side edge of the blade, a clamp strap having end portions extending at generally right angles to the strap adapted to partially encompass spaced rake teeth and an opening in the strap to receive a bolt, a bolt adapted to extend through the opening in the blade between adjacent rake teeth and the strap opening and a threaded nut adapted to be secured to said bolt to clamp the hoe attachment to said rake with said lip butted against the side of one of the rake teeth.

* * * * *